Nov. 25, 1941.  N. SCHNOLL  2,263,932
ELECTRONIC SIGNAL INDICATOR AND CIRCUIT THEREFOR
Filed March 22, 1940  2 Sheets-Sheet 2
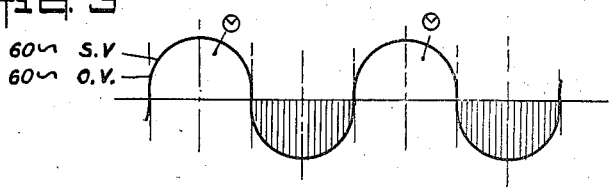
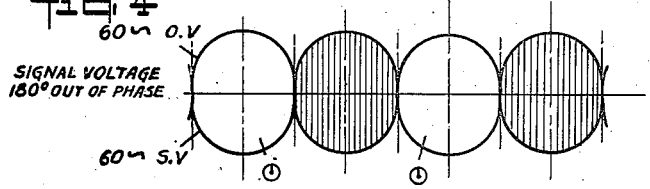
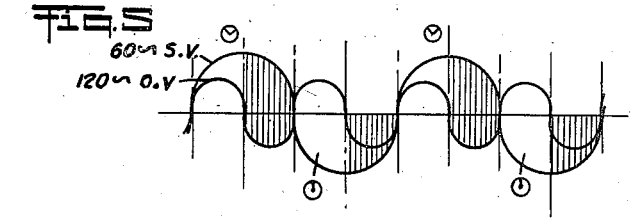
LEGEND
O.V. = OPERATING VOLTAGE TO INDICATOR TUBE
S.V. = SIGNAL VOLTAGE INDICATOR TUBE
① = "EYE" OF INDICATOR TUBE CLOSED
⊘ = "EYE" OF INDICATOR TUBE OPEN
▓ SHADED PORTIONS INDICATE PERIODS OF NON OPERATABILITY OF INDICATOR TUBE
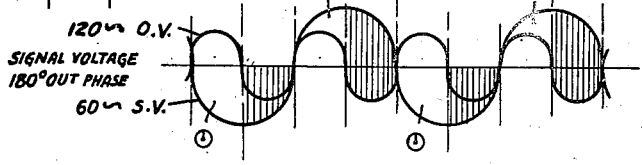
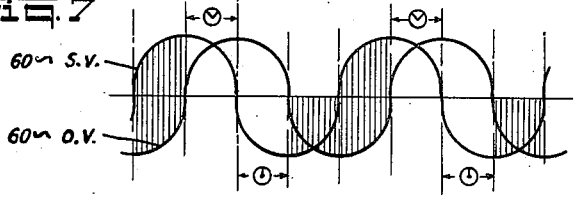
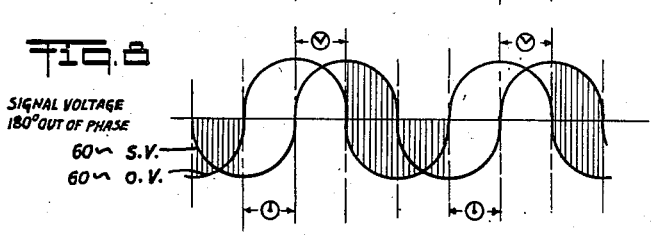
INVENTOR.
Nathan Schnoll
BY Harry Ernest Rubens
ATTORNEY.

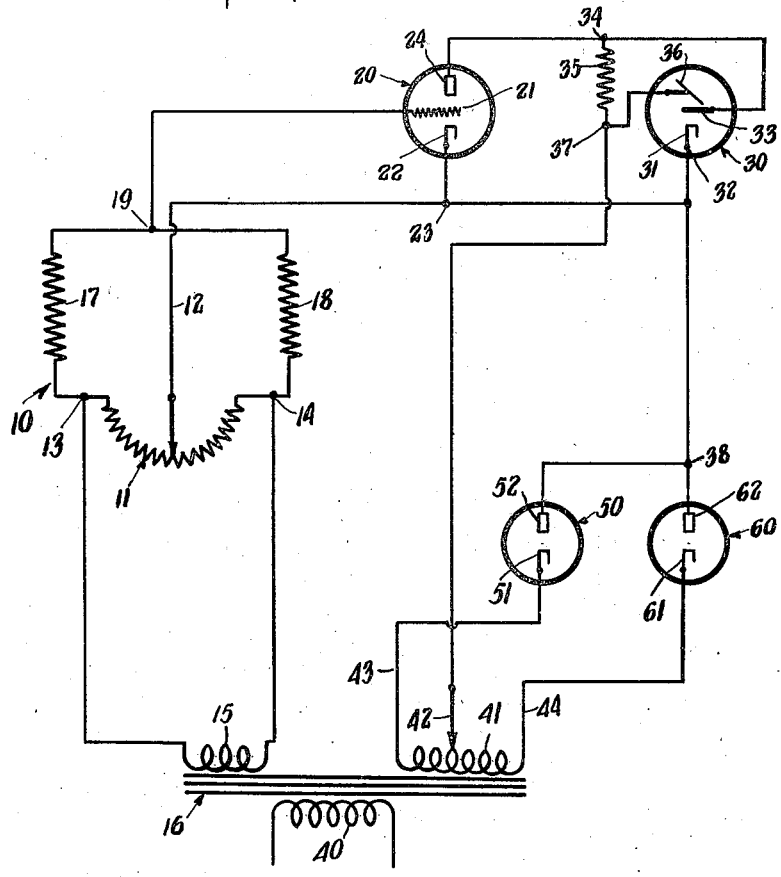
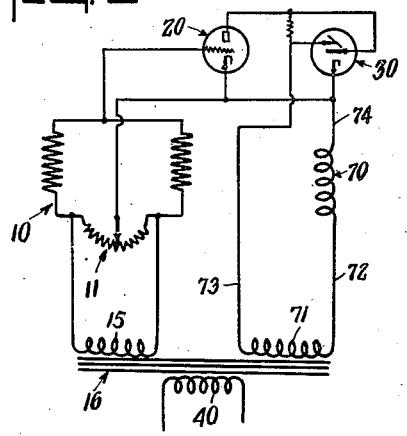

Patented Nov. 25, 1941

2,263,932

UNITED STATES PATENT OFFICE 2,263,932

ELECTRONIC SIGNAL INDICATOR AND CIRCUIT THEREFOR

Nathan Schnoll, Palisade, N. J., assignor to Industrial Instruments, Inc., a corporation of New Jersey Application March 22, 1940, Serial No. 325,401

11 Claims. (Cl. 177—311)

My invention relates to a device employing an electronic signal indicator, and more specially to an alternating current bridge provided with visual means for indicating the null balance.

The practice of using an electronic indicator tube as the null balance indicator in such a bridge is well known.

In cases of this type, the control grid and cathode of the indicator tube are connected to the "detector" junctions of the bridge. Since electronic devices in general require a source of power other than the signal voltage, the practice is to apply a D. C. voltage, thus necessitating an external source of power.

Hence the two sources of power supplied to the electronic tube are the signal voltage connected to the detector terminals, and the external source of power supplied to the operating electrodes.

The "eye" of the electronic indicator tube, as is well known, appears as a shadow angle on the target. When the operating electrodes are connected to a D. C. source, the shadow angle increases from the closed position, when the signal voltage is negative at the control grid, to the fully opened position, as the signal voltage becomes positive. At the zero potential, the shadow angle is about 45° or at a point somewhere between the fully opened and closed position, and this position corresponds to the "null" or balanced position when used with a bridge.

When the signal voltage is A. C., the pattern produced on the "eye" or target consists of two bright lines on each side of the shadow angle. These, I believe, represent the limits of excursion of the potential of the signal voltage, as it fluctuates, from the zero potential position, on either side thereof.

As the zero potential, or balanced position is reached, the two bright lines coincide. This effect makes the balancing operation of the bridge more easily observable.

When the alternating current supplied to the indicator tube is the same as that supplied to the bridge, the two lines of excursion disappear, and only one line remains on each side of the shadow angle. Thus the exact point of balance cannot be easily determined, since it lies somewhere between the fully opened to the fully closed position of the eye, as indicated supra.

I, therefore, have for my principal object, the provision of means for making easily discernible the exact location of the null or balanced position of the bridge, when alternating current is supplied to both the bridge and the electronic indicator tube.

The advantage of using alternating current for both bridge and indicator tube is obvious, since it eliminates the necessity for producing direct current when the current source is alternating.

I accomplish these and other objects and obtain my new results as will be apparent from the device described in the following specification, particularly pointed out in the attached claims, and illustrated in the accompanying drawings, in which:

Fig. 1 illustrates my preferred circuit diagram.

Fig. 2 illustrates a modification thereof.

Fig. 3 is a chart illustrating the relation between the signal voltage and the operating voltage, supplied from the same 60 cycle line.

Fig. 4 illustrates the same, with the signal voltage 180° out of phase by reason of the shift beyond the balance position with consequent phase reversal.

Fig. 5 illustrates a 60 cycle signal voltage and 120 cycle operating voltage.

Fig. 6 illustrates the same with the signal voltage 180° out of phase by reason of the bridge.

Fig. 7 illustrates a 60 cycle signal and operating voltage with the operating voltage 90° out of phase.

Fig. 8 illustrates the same with the signal voltage 180° out of phase by reason of the bridge.

In the drawings, the shaded portions indicate the periods of non-operability of the electronic indicator tube. As is well known, the indicator tube is operative only when the voltage to the anode is positive with respect to the cathode. Thus when alternating current is used as the operating voltage, the tube is operable only on one half of the wave.

As will be apparent from the charts illustrated in Figs. 3 to 8, I have discovered a method of creating a positive determination of the null or balance position despite the use of alternating current to both the bridge and indicator tube. Specifically referring to Figs. 3 and 4, it will be apparent that when a 60 cycle voltage is supplied to both the bridge and tube, the "eye," as indicated by the symbol referred to in the legend, will be either opened or closed, depending on which side of balance the bridge is positioned.

Thus the observer will see only a single position of the "eye," for a given potential.

If the frequency supplied to the operating electrodes of the tube is doubled, as is shown in Fig. 5, the "eye" responds to two positions, for each complete cycle of the signal voltage. Hence, the observer will see two lines on each side of the shadow cycle, representing the limits of excursion of the potential of the signal voltage, as it varies from positive to negative.

Passing from one side of balance to the other, in the bridge, as is known, using alternating current, changes its phase by 180°. This is shown in Fig. 6.

The visual effect, for a given signal potential, is identical, in Figs. 5 and 6, despite this reversal, although in Fig. 4, the "eye" responded differently.

Thus, it will be seen that doubling the operating frequency produces the identical visual effect obtained by using direct current.

In Fig. 7, the frequency of the operating voltage is identical with the signal voltage, namely 60 cycles, but is 90° out of phase. The same result obtained by doubling the operating voltage is obtained, namely, the "eye" responds to two positions, for each complete cycle of the signal voltage. Passing from one side of balance to the other, produces no visual change, for a given signal potential, as will be seen in Fig. 8.

When the operating voltage is out of phase by 180°, the visual advantage ceases as it does for 0° and 360°. The maximum benefits are obtained by a shift of 90°, or 270°.

The conclusion I have drawn from the charts is as follows:

In order to obtain an accurate visual determination of the "null" or balance position for alternating current, it is necessary to provide an operating current to the electronic indicator tube that has positive values during both halves of the cycle of operation of the signal voltage.

I have further discovered that this can be obtained by either changing the frequency of the operating voltage, or changing its phase relationship. Persistence of vision enables both limits of excursion to be seen simultaneously, and as long as the frequency of operation occurs within this range, both lines will appear simultaneously on the "eye" of the tube.

In Fig. 1, I have devised a circuit employing a frequency doubler as one method of obtaining these results. Reference numeral 10 designates the bridge, consisting of a slide wire resistor 11 provided with a bridge slider 12. The terminals 13 and 14 of the resistor are connected to a secondary coil 15, of the transformer 16.

To the terminals 13 and 14 are connected the unknown resistance 17, and the standard resistance 18, which meet in the terminal 19, directly connected to the grid 21 of the electronic amplifier tube 20.

The bridge slider 12 is connected to the cathode 22 of the same tube 20, at the connection 23.

The circuit extends from the amplifier tube 20 to an electronic indicator tube 30, the cathode 22 being connected to the cathode 31, of the respective tubes, at connections 22 and 32 respectively, and similarly, plate 24 of the amplifier tube 20, being connected to the control electrode 33 of the electronic indicator 30, with an intermediate connection 34, for the insertion of a resistance 35 between the target 36 of the tube 30, and said connection, by means of connection 37.

The transformer 16 is provided with the primary 40, connected to the A. C. source of supply. An auxiliary secondary 41 is provided with an intermediate tap 42 leading directly to the target 36 of the tube 30, at connection 37.

The two ends 43 and 44 of the auxiliary secondary 41, are directly connected to the cathodes 51 and 61, respectively of electronic rectifier tubes 50 and 60.

The plates 52 and 62 of rectifier tubes 50 and 60, are connected at 38 and joined with connection 32 leading to cathode 31 of the indicator tube 30. These rectifier tubes thus constitute a frequency doubler between the alternating current supply and the electrodes of the indicator and amplifier tubes.

The following tubes may be used in my apparatus for obtaining satisfactory results: for the electronic amplifier tube—type "6F5"; for the electronic indicator tube—type "6AF6-G"; for the electronic rectifier tube—type "IV".

As the rectifier tubes of the above type are operated on 75 volts, the auxiliary winding 41 steps up the voltage from 110 to 150 volts, or 75 volts on each side of the intermediate tap 42.

In Fig. 2, I have illustrated another simple method of accomplishing the same result employing a simple inductance 70 for establishing a phase relationship, preferably of 90° between the frequency of the operating voltage and the signal voltage. Here the auxiliary secondary winding 71, steps up the voltage to 150 volts, with one lead 72 connected to the inductance 70, and the other lead 73, connected to connection 31. Lead 74 connects the inductance 70, with connection 32.

Two circuits are described in the foregoing which will permit the indicator tube to be operated by alternating current and produces a visual effect similar to that obtained by direct current. It is apparent, however, that the invention is not confined to the particular forms shown and described, the same being purely illustrative and that the invention may be carried out in other ways accomplishing the same result, and therefore, I claim broadly the right to employ all equivalent instrumentalities coming within the scope of the appended claims, and by means of which, objects of my invention are attained and new results accomplished, as it is obvious that the particular embodiments herein shown and described are only some of the many that can be employed to attain these objects and accomplish these results.

What I claim and desire to secure by Letters Patent, is as follows:

1. In an electrical device having an electronic indicator tube provided with terminals for transmitting an alternating signal voltage, and electrodes requiring an external current for operation of the tube, means for supplying a pulsating current to the electrodes, that has positive values during both halves of the cycle of operation of the signal voltage.

2. In an electrical device having an electronic indicator tube provided with terminals for transmitting an alternating signal voltage, and electrodes requiring an external current for operation of the tube, means for supplying a pulsating current to the electrodes that has a frequency that is different from the signal voltage.

3. In an electrical device having an electronic indicator tube provided with terminals for transmitting an alternating signal voltage, and electrodes requiring an external current for operation of the tube, means for supplying a pulsating current to the electrodes that is out of phase with the signal voltage.

4. In an electrical device having an electronic indicator tube provided with terminals for transmitting an alternating signal voltage, and electrodes requiring an external current for operation of the tube, means for supplying an alternating current to the electrodes with a frequency that is greater than the signal voltage.

5. In an electrical device having an electronic indicator tube provided with terminals for transmitting an alternating signal voltage, and electrodes requiring an external current for operation of the tube, means for supplying an alternating current to the electrodes with a frequency that is a multiple of the signal voltage.

6. In an electrical device having an electronic indicator tube provided with terminals for transmitting an alternating signal voltage, and electrodes requiring an external current for operation of the tube, means for supplying an alternating current to the electrodes that is out of phase by 90° with the signal voltage.

7. A combined bridge and indicator, for use on alternating current, comprising a bridge having a set of detector terminals and a connection to the alternating current source; an electronic indicator having connections for the detector terminals and the same alternating current source, and means positioned between the alternating current source and the electronic indicator for supplying an alternating current to the electronic indicator that has positive values, during both halves of the cycle of operation of the alternating current flowing through the detector terminals.

8. A combined bridge and indicator, for use on alternating current, comprising a bridge having a set of detector terminals and a connection to the alternating current source; an electronic indicator having connections for the detector terminals and the same alternating current source, and means positioned between the alternating current source and the electronic indicator for creating a frequency of the pulsating current supplied to electronic indicator which is different from the frequency of the current flowing through the detector terminals.

9. A combined bridge and indicator, for use on alternating current, comprising a bridge having a set of detector terminals and a connection to the alternating current source; an electronic indicator having connections for the detector terminals and the same alternating current source, and means positioned between the alternating current source and the electronic indicator for creating a pulsating current frequency to the electronic indicator that is out of phase by 90° with the current flowing through the detector terminals.

10. A combined bridge and indicator, for use on alternating current, comprising a bridge having a set of detector terminals and a connection to the alternating current source; an electronic indicator having connections for the detector terminals and the same alternating current source, and a frequency doubler positioned between the alternating current source and the electronic indicator for doubling the frequency of the current supplied to the electronic indicator as compared with the frequency of the current flowing through the detector terminals.

11. In an electrical device having an electronic indicator tube provided with terminals for transmitting an alternating signal voltage, and electrodes requiring an external current for operation of the tube, means for supplying a pulsating current to the electrodes with a frequency that is different from the signal voltage for creating a supply current that has positive values during both halves of the cycle of operation of the signal voltage.

NATHAN SCHNOLL.